United States Patent
Lorenz et al.

(10) Patent No.: US 7,893,189 B2
(45) Date of Patent: Feb. 22, 2011

(54) POLY(ETHER-ESTER) POLYOLS AND PROCESSES FOR THEIR PRODUCTION

(75) Inventors: Klaus Lorenz, Dormagen (DE); Jorg Hofmann, Krefeld (DE); Hartmut Nefzger, Pulheim (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 12/700,050

(22) Filed: Feb. 4, 2010

(65) Prior Publication Data

US 2010/0137552 A1     Jun. 3, 2010

Related U.S. Application Data

(62) Division of application No. 11/375,939, filed on Mar. 15, 2006, now Pat. No. 7,687,599.

(30) Foreign Application Priority Data

Mar. 19, 2005    (DE)  .................... 10 2005 0127940

(51) Int. Cl.
    *C08G 63/06*     (2006.01)
(52) U.S. Cl. .............. 528/361; 528/271; 528/272; 528/365; 528/366; 528/403; 528/421; 560/3; 560/64; 562/473; 562/480
(58) Field of Classification Search .......... 528/271, 528/272, 300, 301, 302, 303, 304, 305, 306, 528/307, 308, 354, 361, 366, 403, 421; 560/3, 560/29, 42, 45, 53, 55, 59, 60, 61, 63, 64; 562/464, 465, 473, 480
See application file for complete search history.

(56) References Cited

U.S. PATENT DOCUMENTS

| | | |
|---|---|---|
| 3,538,043 A | 11/1970 | Herold |
| 4,088,635 A | 5/1978 | Browne et al. |
| 4,220,753 A * | 9/1980 | Cerefice et al. ............ 528/302 |
| 4,605,729 A | 8/1986 | Barnes et al. |
| 4,952,645 A | 8/1990 | Mulhaupt et al. |
| 5,032,671 A | 7/1991 | Harper |
| 5,145,883 A | 9/1992 | Saito et al. |
| 5,710,207 A | 1/1998 | Moller et al. |
| 5,789,626 A | 8/1998 | Le-Khac |
| 5,990,232 A | 11/1999 | Shen et al. |
| 6,355,845 B1 | 3/2002 | Clement et al. |
| 6,429,342 B1 | 8/2002 | Clement et al. |
| 6,642,423 B2 | 11/2003 | Clement et al. |
| 6,753,402 B1 | 6/2004 | Bauer et al. |
| 2002/0198413 A1 | 12/2002 | Clement et al. |
| 2004/0266982 A1 | 12/2004 | Clement et al. |
| 2007/0010593 A1 | 1/2007 | Nefzger et al. |
| 2007/0049721 A1 | 3/2007 | Nefzger et al. |
| 2007/0098939 A1 | 5/2007 | Inaba |

FOREIGN PATENT DOCUMENTS

| | | |
|---|---|---|
| EP | 1 112 243 B1 | 3/2004 |
| JP | 48010077 | 3/1973 |
| JP | 48031758 | 10/1973 |
| WO | 95/00574 A1 | 1/1995 |
| WO | 03/076488 A1 | 9/2003 |
| ZA | 6080027 | 7/1969 |

\* cited by examiner

*Primary Examiner*—James Seidleck
*Assistant Examiner*—Frances Tischler
(74) *Attorney, Agent, or Firm*—N. Denise Brown; Noland J. Cheung

(57) ABSTRACT

The invention is directed to novel poly(ether-ester)polyols, processes for their production from monocarboxylic or polycarboxylic acid esters with one or more bound polyether chain(s). This invention also relates to the production of polyurethane materials in which the isocyanate-reactive component comprises these poly(ether-ester)polyols.

2 Claims, No Drawings

POLY(ETHER-ESTER) POLYOLS AND PROCESSES FOR THEIR PRODUCTION

CROSS REFERENCE TO RELATED PATENT APPLICATION

The present patent application claims the right of priority under 35 U.S.C. §119 (a)-(d) of German Patent Application No 102005012794.0, filed Mar. 19, 2005.

BACKGROUND OF THE INVENTION

The present invention relates to poly(ether-ester)polyols, processes for their production from monocarboxylic or polycarboxylic acid esters with one or more bound polyether chain(s), and to the production of polyurethanes from these poly(ether-ester)polyols.

Poly(ether-ester)polyols having a block structure are used, for example, in the production of polyurethane materials as phase modifiers in polyol formulations which contain polyester polyols and polyether polyols. Poly(ether-ester)polyols having ester groups distributed evenly along the polymer chains are desirable in PUR applications which require a combination of advantageous polyether properties such as, for example, hydrolysis resistance and low viscosity, on the one hand, and on the other hand, advantageous polyester properties, such as, for example, high abrasion resistance, high tear propagation resistance, high elongation at break and tear strength and good solvent resistance.

Poly(ether-block-esters) having a defined AB two-block or ABA three-block structure cannot be obtained through base-catalysed or acid-catalysed addition of alkylene oxides to OH-functional polyesters, since these polyesters are subject to transesterification and cleavage reactions in the presence of such catalysts. In the production of poly(ether-ester)polyols, one is therefore dependent on prefabricated poly(ether)polyols which in a second step are transesterified or esterified with polyesters or polycarboxylic acids, polycarboxylic acid esters, polycarboxylic acid halides or polycarboxylic acid anhydrides, and low-molecular-weight polyols to form an $(AB)_n$ multiblock copolymer. The choice of stoichiometry of the reactants polyether polyol, polycarboxylic acid (derivative) and low-molecular-weight polyol in the esterification or transesterification step determines the average length of the polyester blocks inserted between the polyether blocks. The block structure, the length of the polyester blocks and the functionality of the products are always subject, however, to the statistics prevailing in the production of polycondensates from polyfunctional starting components. The use of double metal cyanide complex catalysis (DMC catalysis) allows polyester polyols to be used as starter components for the production of poly(ester-block-ether)polyols having an AB two-block or ABA three-block structure, and is thus, an improvement on the former processing mode.

WO 01/27185 describes the production of poly(ester-block-ether)polyols starting from polyesters with DMC-catalysed addition of alkylene oxides. According to the process described in WO 03/076488, higher-functional poly(ester-block-ether) polyols are obtained starting from higher-functional polyesters with DMC catalysed addition of alkylene oxides. ABA three-block structures are obtained on the basis of the processing modes described in these two patents, but it is not possible to produce poly(ether-ester)polyols having ester bonds which are distributed homogeneously and evenly along the polymer chains.

According to the teaching of DE 17 70 548 A, poly(ether-esters) are obtained by DMC-catalysed reaction of carboxylic anhydrides with alkylene oxides. The poly(ether-esters) can contain both carboxylic acid and hydroxyl terminal groups. Similarly, U.S. Pat. No. 5,145,883 describes the production of poly(ether-esters) by reacting carboxylic anhydrides and alkylene oxides in the presence of polyether polyols as starter compounds. A disadvantage of the processes described therein, lies in the tendency towards alternating insertion of the comonomers, as a result of which, if excesses of alkylene oxide are used, poly(ether-esters) with block structures are obtained rather than with ester bonds distributed homogeneously and evenly along the polymer chains.

According to WO 95/00574, poly(ester-block-ether) elastomers are obtained by reacting difunctional polyether polyols having a small content of olefinic double bonds (<0.03 meq/g polyether) with polyesters of low-molecular-weight diols and dicarboxylic acids with catalysis using transesterification catalysts. With this method too, poly(ether-ester) polyols with $(AB)_n$ multiblock structures are obtained rather than with ester bonds distributed homogeneously and evenly along the polymer chains.

According to U.S. Pat. No. 5,032,671, alkylene oxides and lactones are reacted with DMC catalysis, optionally, using OH-functional starters, to give poly(ether-esters) or poly(ether-ester)polyols. The polymer chains have a block structure or a random distribution of ether and ester bonds. Using the method described in this patent, it is not possible to control the comonomer insertion.

WO 01/04179 and EP 1 112 243A describe the production of esters with one or more bound polyether chain(s) by reacting hydroxyl group-containing esters of carboxylic acids using DMC catalysis. The further reaction of these materials to give poly(ether-esters) with ester bonds distributed homogeneously and evenly along the polymer chains is not disclosed.

The production of poly(ether-esters) having ester bonds distributed homogeneously and evenly along the polymer chains, and highly defined functionalities using DMC catalysis has not previously been described. In addition, the production of poly(ether-esters) is always performed by means of multi-stage processes.

The object of the present invention was to provide a process for producing poly(ether-esters), which is characterised by a simple reaction sequence that leads from the starting materials to the product, without complex workup steps and which gives access to structures with ester bonds distributed homogeneously and evenly along the polymer chains, as well as highly defined functionalities.

SUMMARY OF THE INVENTION

It has now been found that monocarboxylic or polycarboxylic acid esters having one or more bound polyether chain(s) can be obtained by reacting hydroxyl group-containing monocarboxylic acid esters and/or polycarboxylic acid esters with alkylene oxides. In preferred embodiments of the invention, one variation includes one or more diols and/or polyols, and, another variation includes, optionally, one or more dicarboxylic acid esters, additionally being present in the above described alkylene oxide addition reaction. The reaction with the alkylene oxides is preferably performed in the presence of double metal cyanide complex catalysts, since the ester groups are then not subject to any disruptive secondary reactions. The desired poly(ether-ester) structures are obtained by subsequent transesterification, optionally, with the addition of a transesterification catalyst, and optionally, with the addition of further diols and/or polyols, and/or further dicarboxylic acid derivatives. The diols and/or polyols, and dicarboxylic acid derivatives which are optionally added, serve to adjust the desired OH value and to adjust the ester group density. Surprisingly, the second stage of poly(ether-ester) polyol synthesis (i.e. the transesterification reaction) can also be performed with no further working up, directly following the alkylene oxide addition. This represents a significant advantage in the management of the process.

If higher-functional polyols (i.e. those having a functionality >2) are added alone, or as a blend with difunctional polyols, either before or during the alkylene oxide addition reaction or before the transesterification reaction, products having a defined functionality are obtained. Such poly(ether-ester) structures are not obtainable via the polycondensation methods of the prior art. Rather, these prior methods lead to a mixture of products of differing functionality, and the maximum functionality that can be achieved is also limited by the process conditions due to crosslinking reactions.

Branched, likewise non-crosslinking, polyfunctional poly (ether-ester) structures can be obtained by alkylene oxide addition to carboxylic acid esters containing several hydroxyl groups, followed by a subsequent transesterification reaction, with the optional addition of diols and/or polyols.

It is equally possible to obtain linear or branched, non-crosslinking, polyfunctional poly(ether-ester) structures having ester terminal groups by alkylene oxide addition to monocarboxylic or polycarboxylic acid esters containing a hydroxyl group, followed by a subsequent transesterification reaction with the addition of monocarboxylic acid esters or polycarboxylic acid esters, which can likewise contain a free hydroxyl group.

A further variation of the present invention comprises the saponification of the monocarboxylic or polycarboxylic acid esters with one bound polyether chain to give the corresponding monocarboxylic or polycarboxylic acids having one bound polyether chain. These can be converted to linear or branched polyfunctional poly(ether-ester) structures having carboxylic acid terminal groups by subsequent esterification with optionally added monocarboxylic or polycarboxylic acids, which may also contain a free hydroxyl group.

Thus, the present invention provides a process for producing poly(ether-esters). This process comprises:

(1) reacting
  a) one or more monocarboxylic or polycarboxylic acid esters containing one or more hydroxyl groups and having the general formula:

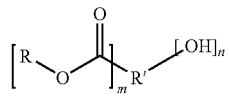

wherein:
    R represents a monovalent aryl, alkyl, aralkyl, alkenyl or alkynyl radical,
    R' represents an at least divalent aryl, alkyl, aralkyl, alkenyl or alkynyl radical,
    in which:
      $m=1$ and $n=1$,
      $m \geq 2$ and $n=1$,
      or
      $n \geq 2$ and $m=1$,
  with
  b) one or more alkylene oxides, with ring opening to give the corresponding monocarboxylic acid esters or polycarboxylic acid esters having one or more bound polyether chains, in which the alkylene oxide addition is optionally performed in the presence of:
  c) one or more diols and/or polyols,
and, optionally,
  d) one or more dicarboxylic acid esters;

and then, further:

(2) reacting the products produced in step (1) by one of the following:
  (i) transesterifying the products from (1) to yield hydroxyl-functional poly(ether-esters), in which the transesterification is optionally performed with addition of:
    (a) one or more diols and/or polyols,
    or, optionally,
    (b) one or more diols, and dicarboxylic acids or dicarboxylic acid derivatives,
    or, optionally,
    (c) one or more diols or polyols, and monocarboxylic acid esters or monocarboxylic acids containing one or more hydroxyl groups,
  (ii) transesterification of the products from (1) with
    (a) additional monocarboxylic acid esters and/or polycarboxylic acid esters, which can contain a free hydroxyl group,
    to yield poly(ether-esters) having ester terminal groups,
  or
  (iii) saponification (i.e. hydrolysis) of the products from (1) to yield the corresponding monocarboxylic acids or polycarboxylic acids with a bound poly(ether) chain, and esterification of these acids with optionally added monocarboxylic acids and/or polycarboxylic acids, which can contain a free hydroxyl group, to yield poly(ether-esters) having carboxylic acid terminal groups.

DETAILED DESCRIPTION OF THE INVENTION

Suitable compounds to be used as starting components for the production of monocarboxylic or polycarboxylic acid esters with bound polyether chains for component a) in reaction step (1) include aromatic hydroxyl group-containing monocarboxylic acid esters or polycarboxylic acid esters such as, for example, the methyl, ethyl, n-propyl, isopropyl, n-butyl, isobutyl, tent-butyl esters of the various isomers of hydroxybenzoic acid, the esters of the various isomers of hydroxymethylbenzoic acid, the esters of the various isomers of dihydroxybenzoic acid, the esters of trihydroxybenzoic acid, the esters of hydroxyphenylacetic acid, the esters of hydroxyphthalic acid and the esters of hydroxynaphthoic acid.

Suitable aliphatic hydroxyl group-containing monocarboxylic acid esters or polycarboxylic acid esters include, for example, the esters of glycolic acid, mandelic acid, lactic acid, 2-hydroxybutyric acid, 3-hydroxybutyric acid, 3-hydroxypropionic acid, tropic acid, ricinoleic acid, glyceric acid, hydroxymalonic acid, malic acid and citric acid. Lactones can also be used, but they must first be converted into the corresponding open-chain hydroxyl group-containing carboxylic acid esters by reaction with an alcohol. The individual monocarboxylic acid esters containing one or more hydroxyl groups or the individual polycarboxylic acid esters containing one hydroxyl group can also be used in a blend.

Suitable diols or polyols which are optionally added in reaction step (1) as component c) preferably have functionalities of 2 to 8. Examples of suitable diols and polyols include compounds such as propylene glycol, ethylene glycol, diethylene glycol, 1,2-butanediol, 1,3-butanediol, 1,4-butanediol, hexanediol, pentanediol, 3-methyl-1,5-pentanediol, 1,12-dodecanediol, glycerol, trimethylol propane, triethanolamine, pentaerythritol, sorbitol, sucrose, hydroquinone, catechol, resorcinol, bisphenol F, bisphenol A, 1,3,5-trihydroxybenzene, condensates of formaldehyde and phenol or melamine or urea containing methylol groups, and Mannich bases. Alkylene oxide addition products of the previously mentioned diols or polyols (i.e. polyether polyols) having OH values of 6 to 800 mg KOH/g can also be used.

In addition to the aforementioned diols, polyols or corresponding poly(ether) polyols, dicarboxylic acid esters, i.e. component d), can also optionally be added in reaction step (1). With the addition of dicarboxylic acid esters, in addition to the previously mentioned adjustment of the desired ester group density and OH value, the density of the OH groups at the start of the alkylene oxide addition reaction can also be reduced extremely easily, which in the case of DMC catalysis, in particular, offers a processing advantage. The esters of the following acids are cited here by way of example as suitable dicarboxylic acid esters: succinic acid, glutaric acid, adipic acid, phthalic, isophthalic or terephthalic acid, suberic acid, azelaic acid, sebacic acid, maleic acid, fumaric acid, and mixtures thereof.

Suitable alkylene oxides to be used as component b) in reaction step (1) include, for example, ethylene oxide, propylene oxide, 1,2-butylene oxide or 2,3-butylene oxide and styrene oxide. Propylene oxide and ethylene oxide, either individually or as mixtures, are preferably used. The polyaddition reaction can be catalysed both by Lewis acids such as $BF_3O(Et)_2$ or $B(C_6F_5)_3$ and by bases such as alkaline or alkaline-earth metal hydroxides, and by double metal cyanide complex catalysts. The reaction in step (1) is preferably performed using DMC catalysts.

The DMC catalysts which are particularly suitable for the process according to the invention are known in principle. DMC catalysts have found commercial interest primarily for the production of polyether polyols by polyaddition of alkylene oxides to starter compounds displaying active hydrogen atoms (see for example, U.S. Pat. Nos. 3,404,109, 3,829,505, 3,941,849 and 5,158,922, the disclosures of which are hereby incorporated by reference). The use of DMC catalysts leads to a reduction in the content of monofunctional polyethers having terminal double bonds, i.e. the so-called monools, in comparison to the conventional production of polyether polyols using alkaline catalysts. Improved, highly active DMC catalysts, which are described for example in U.S. Pat. No. 5,470,813, U.S. Pat. No. 5,482,908 and U.S. Pat. No. 5,536,883 (believed to correspond to EP-A 700 949), U.S. Pat. No. 5,712,216 and U.S. Pat. No. 6,018,017 (believed to correspond to EP-A 743 093), U.S. Pat. Nos. 5,545,601 and 5,637,673 (believed to correspond to EP-A 761 708), U.S. Pat. No. 5,627,120 and U.S. Pat. No. 5,789,626 (believed to correspond to WO 97/40086), U.S. Pat. No. 5,714,428 (believed to correspond to WO 98/16310) and U.S. Pat. No. 6,585,566 (believed to correspond to WO 00/47649), the disclosures of which are hereby incorporated by reference, additionally have an unusually high activity and allow polyether polyol production with very low catalyst concentrations (e.g. 25 ppm or less), such that the catalyst no longer has to be separated out of the final product. The highly active DMC catalysts described in, for example, U.S. Pat. No. 5,482,908 and U.S. Pat. No. 5,536,883 (believed to correspond to EP-A 700 949), which in addition to a double metal cyanide compound (e.g. zinc hexacyanocobaltate(III)) and an organic complex ligand (e.g. tert-butanol) also contain a polyether with a number-average molecular weight greater than 500 g/mol, are a typical example.

The addition of alkylene oxides to starting mixtures containing one or more monocarboxylic and/or polycarboxylic acid esters which contain one or more hydroxyl groups can be continued until an OH value is reached that is as low as is desired. The OH value range from 5 to 420 is preferred. The various alkylene oxides can also be added blockwise instead of as a mixture. In such cases, monocarboxylic or polycarboxylic acid esters are obtained wherein the bound polyether chain(s) display block structures. Pure ethylene oxide or mixtures of propylene oxide and ethylene oxide with a high ethylene oxide content are preferably added as the terminal block so that the polyether chains bound to the monocarboxylic or polycarboxylic acid esters contain from about 40 to 100% primary OH terminal groups.

The hydroxyl group-containing (poly)carboxylic acid esters used in accordance with the present invention as starter components a), the optionally added diols or polyols, i.e. component c), and the optionally added dicarboxylic acid esters, i.e. component d), can be placed in the reactor in advance, or supplied to the reactor continuously during the reaction together with the alkylene oxide. In the latter processing mode, a small amount of an addition product comprising starter and alkylene oxide is conventionally placed in the reactor in advance. It is also possible that this addition product is the product that it to be produced by the process. It is equally possible to remove the reaction product continuously from the reactor, in which case catalyst must also be continuously supplied to the reactor, in addition to alkylene oxide and starter. The various processing variants for the production of polyethers by the alkylene oxide addition method with DMC catalysis are described in the previously mentioned documents, and are also disclosed in, for example, U.S. Pat. No. 5,777,177 and U.S. Pat. No. 5,919,988 (believed to correspond to WO 97/29146) and in U.S. Pat. No. 5,689,012 (believed to correspond to WO 98/03571), the disclosures of which are hereby incorporated by references.

The DMC-catalysed polyaddition of alkylene oxides is generally performed at temperatures of 20 to 200° C., preferably 40 to 180° C., and more preferably at temperatures of 50 to 150° C. The reaction can be performed at overall pressures of 0.0001 to 20 bar. The polyaddition reaction can be performed in bulk, or in an inert organic solvent such as toluene and/or THF. The amount of solvent is typically from about 10 to about 30 wt. %, based on the total amount of alkylene oxide addition product to be produced.

The catalyst concentration is chosen such that under the specified reaction conditions, good control of the polyaddition reaction is possible. The catalyst concentration is generally 0.0005 wt. % to 1 wt. %, preferably 0.001 wt. % to 0.1 wt. %, and more preferably 0.001 to 0.03 wt. %, based on the total amount of alkylene oxide addition product to be produced. Small amounts (i.e. 1 to 500 ppm, relative to the amount of starter) of organic or inorganic acids, as described in U.S. Pat. No. 6,077,978 (believed to correspond to WO 99/14258), the disclosure of which is hereby incorporated by reference, can be added to the hydroxyl group-containing (poly)carboxylic acid esters used according to the invention as starter components, and the optionally added diols and/or polyols, and the optionally added dicarboxylic acid esters.

Age resistors such as, for example, antioxidants can also optionally be added to the alkylene oxide addition products obtained according to step (1).

In one embodiment of the process according to the invention, the products obtained in step (1) are reacted under transesterification conditions, optionally with addition of further diols or polyols, to give OH-functionalised poly(ether-esters), i.e. step (2)(i). The optionally added diols and/or polyols, component (i)(a), preferably display functionalities of 2 to 8. Suitable compounds include, by way of example, propylene glycol, ethylene glycol, diethylene glycol, 1,2-, 1,3-, 1,4-butanediol, hexanediol, pentanediol, 3-methyl-1,5-pentanediol, 1,12-dodecanediol, glycerol, trimethylol propane, triethanolamine, pentaerythritol, sorbitol, sucrose, hydroquinone, catechol, resorcinol, bisphenol F, bisphenol A, 1,3, 5-trihydroxybenzene, condensates of formaldehyde and phenol or melamine or urea containing methylol groups, and Mannich bases. Alkylene oxide addition products of the previously mentioned diols or polyols (i.e. polyether polyols) having OH values of 6 to 800 mg KOH/g can also added at this point. The person skilled in the art is easily able to calculate the amount of these diols and/or polyols, i.e. component (i)(a) of this step, which are optionally to be added from the desired OH value of the poly(ether-ester) to be produced.

In order to produce the OH-functionalised poly(ether-esters), the previously mentioned starting materials can be polycondensed catalyst-free or in the presence of transesterification catalysts, conveniently in an atmosphere of inert gases, such as, for example, nitrogen, helium or argon, and also in the melt at temperatures of 150 to 300° C., preferably 180 to 230° C., until the desired OH value of the resultant product is achieved.

In a preferred variation, transesterification is performed at a pressure of less than 500 mbar, preferably 1 to 150 mbar. The pressure can be adjusted to the reaction progress during the reaction to suppress the removal of highly volatile starting components in the initial stage of polycondensation.

All known transesterification catalysts such as mineral acids, Lewis acids and bases can be used to accelerate the transesterification reaction. Iron, cadmium, cobalt, lead, zinc, antimony, magnesium, titanium and tin catalysts in the form of metals, metal oxides or metal salts, e.g. metal alkoxides, are also considered, suitable. Reference is also made, in this connection, to improved transition metal catalysts which have recently become known and which are less sensitive to hydrolysis. Catalysts such as these are described in, for example, U.S. Pat. No. 6,541,411 (believed to correspond to DE-A 100 59 612), the disclosure of which is hereby incorporated by reference.

If products with a higher branching point density or a higher density of ester groups are desired, it is naturally possible to also incorporate low-molecular-weight monocarboxylic acid esters or low-molecular weight monocarboxylic acids with one or more bound hydroxyl groups, i.e. component (i)(c), in the transesterification reaction. Examples of such compounds are aromatic and aliphatic hydroxyl group-containing carboxylic acids or esters thereof, such as, for example, the various isomers of hydroxybenzoic acid, the various isomers of hydroxymethylbenzoic acid, the various isomers of dihydroxybenzoic acid, trihydroxybenzoic acid, hydroxynaphthoic acid, glycolic acid, mandelic acid, lactic acid, 2-hydroxybutyric acid, 3-hydroxybutyric acid, 3-hydroxypropionic acid, tropic acid, ricinoleic acid and glyceric acid. Lactones can likewise be used.

If monocarboxylic acid esters obtained according to step (1) with a bound polyether chain are further reacted in step (2), then the transesterification reaction can also include, dicarboxylic acids or their esters, i.e. component (i)(b), in addition to diols, to produce a higher density of ester groups. The following compounds are mentioned here by way of example: succinic acid, glutaric acid, adipic acid, phthalic, isophthalic or terephthalic acid, suberic acid, azelaic acid, sebacic acid, maleic acid, fumaric acid and mixtures thereof, as well as mixtures which predominantly contain the mentioned acids or their esters.

Age resistors such as, for example, antioxidants can optionally be added to the OH-functionalised poly(ether-esters) obtained.

In another embodiment of the process according to the invention, the products produced in step (1) are reacted with additional (ii)(a) monocarboxylic and/or polycarboxylic acid esters, which can likewise contain a free hydroxyl group, under transesterification conditions to yield poly(ether-ester) structures having ester terminal groups, i.e. step (2)(ii). The added dicarboxylic or polycarboxylic acid esters preferably display functionalities of 2 to 3. Examples of compounds which are suitable herein include, for example, the diesters of succinic acid, glutaric acid, adipic acid, phthalic, isophthalic or terephthalic acid, suberic acid, azelaic acid, sebacic acid, maleic acid and fumaric acid. Suitable triesters are for example the esters of trimesic acid, trimellitic acid and tricarballylic acid. Suitable carboxylic acid esters having a free hydroxyl group are for example the methyl, ethyl, n-propyl, n-butyl esters of the various isomers of hydroxybenzoic acid, the esters of the various isomers of hydroxymethylbenzoic acid, the esters of glycolic acid, mandelic acid, lactic acid, 2-hydroxybutyric acid, 3-hydroxybutyric acid, 3-hydroxypropionic acid, tropic acid, ricinoleic acid, hydroxymalonic acid, malic acid and citric acid. The reaction conditions here correspond to those described above for the transesterification process. Age resistors such as, for example, antioxidants can optionally be added to the poly(ether-esters) obtained in this way having ester terminal groups.

In a further embodiment of the process according to the invention, the products produced in step (1) are further reacted in a second step, i.e. step (2)(iii), by hydrolysing with water, to yield the corresponding monocarboxylic or polycarboxylic acids containing a bound polyether chain. This reaction can be catalysed with acids or bases. Corresponding processing modes are known to the person skilled in the art. The monocarboxylic or polycarboxylic acids thus obtained containing a hound polyether chain, can be further reacted by esterification reactions, optionally, after addition of further dicarboxylic or polycarboxylic acids which may also contain a hydroxyl group, i.e. component (iii)(a), to form linear, star-shaped or branched poly(ether-ester) structures having carboxylic acid terminal groups. Suitable dicarboxylic or polycarboxylic acids include, for example, succinic acid, glutaric acid, adipic acid, phthalic, isophthalic or terephthalic acid, suberic acid, azelaic acid, sebacic acid, maleic acid, fumaric acid, trimesic acid, trimellitic acid, tricarballylic acid and pyromellitic acid. Cyclic anhydrides of the mentioned acids can also be used. Suitable carboxylic acids having a free hydroxyl group include, for example, the various isomers of hydroxybenzoic acid, the various isomers of hydroxymethylbenzoic acid, glycolic acid, mandelic acid, lactic acid, 2-hydroxybutyric acid, 3-hydroxybutyric acid, tropic acid, ricinoleic acid, hydroxymalonic acid, malic acid and citric acid.

In order to produce the carboxylic acid-functionalised poly (ether-esters), the above mentioned starting materials can be polycondensed catalyst-free or in the presence of esterification catalysts, conveniently in an atmosphere of inert gases. Suitable inert gases include, for example, nitrogen, helium or argon. The above mentioned starting materials can also be polycondensed in the melt at temperatures of 150 to 300° C., preferably 180 to 230° C., and optionally, until the desired acid value is achieved.

In a preferred variation, esterification is performed under a pressure of less than 500 mbar, preferably 1 to 150 mbar. The pressure can be adjusted to the reaction progress during the reaction to suppress the removal of highly volatile starting components in the initial stage of polycondensation. In addition to mineral acids, iron, cadmium, cobalt, lead, zinc, antimony, magnesium, titanium and tin catalysts in the form of metals, metal oxides or metal salts can be used as esterification catalysts. In the polycondensation process, diluents and/or entrainers, such as, for example, benzene, toluene, xylene or chlorobenzene can be added to the reaction mixture for the azeotropic removal of the condensation water by distillation.

Age resistors such as, for example, antioxidants can optionally be added to the poly(ether-esters) thus obtained having carboxylic acid terminal groups.

The poly(ether-esters) produced according to steps (1) and (2)(i) having hydroxyl terminal groups can be used as starting components for the production of solid or foamed polyurethane materials and of polyurethane elastomers.

To this end the poly(ether-esters) having hydroxyl terminal groups are optionally mixed with additional isocyanate-reactive components, and reacted with organic polyisocyanates, optionally, in the presence of blowing agents, and in the presence of catalysts, and, optionally, in the presence of other additives such as cell stabilisers. Such reactions result in the production of polyurethanes.

The polyurethane materials can be produced by the methods described in the literature, e.g. the one-shot or prepolymer method, using mixing devices known in principle to the person skilled in the art.

EXAMPLES

Starting Materials

The following components were used in the working examples:

Polyol A: a difunctional polyether with an OH value of 260, and produced by adding propylene oxide to propylene glycol Polyol B: a trifunctional polyether with an OH value of 238, produced by adding propylene oxide to glycerol DMC catalyst: a double metal cyanide catalyst, containing zinc hexacyanocobaltate, tert-butanol and polypropylene glycol, with a number-average molecular weight of 1000 g/mol; prepared as described in U.S. Pat. Nos. 5,482,908 and 5,536,883, the disclosures of which are herein incorporated by reference, and which are believed to correspond to EP-A 700 949

Example 1

Production of a Monocarboxylic Acid Ester with a Bound Polypropylene Oxide Chain 0.105 g of DMC catalyst were added to 333.1 g of p-hydroxybenzoic acid ethyl ester in a 2 l pressurised autoclave. The ambient oxygen was removed by repeated evacuation and gassing with nitrogen. The reactor pressure at the start of the addition of propylene oxide was 0.1 bar, the agitator speed was set to 800 rpm, and the reaction temperature was 130° C. A total of 682 g of propylene oxide were added as follows. First, 132 g of propylene oxide were added over a period of 2 h in 3 equal portions. After adding a further 20 g of propylene oxide the reaction started, as indicated by a sudden fall in pressure in the reactor. The remaining propylene oxide was able to be added within 2 hours. On completion of the addition of propylene oxide, the reaction was allowed to continue until the pressure in the reactor assumed a constant value of 0.8 bar. The product was then heated for 30 minutes at 90° C. and 20 mbar, and reacted further with no further workup.

OH value of resultant product: 105.5 mg KOH/g

Viscosity of resultant product at 25° C.: 225 mPas

Example 2

Production of a Difunctional Poly(Ether-Ester)

247 g of Polyol A were added to 989 g of the product from Example 1. After the addition of 100 mg of titanic acid tetrabutyl ester, the mixture was heated to 200° C., first under nitrogen, then under vacuum (1 mbar) with stirring. After 85 g of ethanol had been distilled off, the reaction was terminated.

OH value of the resultant product: 57.6 mg KOH/g

Viscosity of the resultant product: 9360 mPas at 25° C.

Example 3

Propoxylation of a Mixture Comprising a Trifunctional Polyol and 4-Hydroxybenzoic Acid Ethyl Ester and Transesterification to Give the Trifunctional Polyether-Ester 0.3 g of DMC catalyst were added to 840.4 g of Polyol B and 592.4 g of 4-hydroxybenzoic acid ethyl ester in a 10 l pressurised autoclave. The reactor contents were heated for 53 minutes at 80° C. in vacuo whilst being stirred (800 rpm). At the start of the addition of propylene oxide, the reactor pressure was 0.2 bar, the agitator speed for the reaction was kept at 800 rpm, and the reaction temperature was 130° C. A total of 567.23 g of propylene oxide were added at a constant rate over a period of 2.67 h. After 189 g of propylene oxide was added, the reaction start was indicated by a sudden drop in pressure in the reactor (maximum pressure reached: 1.35 bar). On completion of the addition of propylene oxide, the reaction was allowed to continue at 130° C. until a constant pressure of 0.4 bar was reached. After cooling to 90° C., the reactor contents were heated for 30 minutes at 20 mbar. The autoclave was then brought to normal pressure by pressurising with nitrogen and the contents were cooled to 50° C. A sample of the propoxylate was taken in order to determine the OH value and viscosity.

OH value of resultant product: 196.15 mg KOH/g

Viscosity of resultant product at 25° C.: 301 mPas

To this product, 197.7 mg of titanic acid tetrabutyl ester were added. The mixture was heated to 200° C., first under normal pressure, then under vacuum (1 mbar). After 160 g of ethanol had been distilled off, the reaction was terminated.

OH value of resultant product: 106.7 mg KOH/g

Viscosity of resultant product at 25° C.: 20,900 mPas

Example 4

Propoxylation/Ethoxylation of a Mixture Comprising a Trifunctional Polyol and 4-Hydroxybenzoic Acid Ethyl Ester and Transesterification to Give the Trifunctional Polyether-Ester 313 mg of DMC catalyst were added to 568.2 g of polyol B, 400.5 g of 4-hydroxybenzoic acid ethyl ester and 275 mg of 85% phosphoric acid in a 10 l pressurised autoclave. The reactor contents were heated for 5 h at 80° C. in vacuo with stirring (at 800 rpm). The pressure was increased to 1.5 bar by the addition of nitrogen, and 206.55 g of propylene oxide were added at 140° C. within 1.43 h while stirring (at 800 rpm). After 130 g of propylene oxide was added, the reaction start was indicated by a sudden fall in pressure in the reactor (maximum pressure reached: 3.2 bar). Directly following the addition of propylene oxide, 826.4 g of ethylene oxide were added at 140° C. over a period of 2.13 h while stirring (at 800 rpm). The reaction was allowed to continue at 140° C. until a constant final pressure of 1.9 bar was reached. After cooling to 90° C., the reactor contents were heated for 30 minutes at 20 mbar. The autoclave was then brought to normal pressure by pressurising with nitrogen and the contents cooled to 50° C. A sample of the alkylene oxide addition product was taken in order to determine the OH value and viscosity.

OH value of the resultant product: 134.4
Viscosity of the resultant product at 25° C.: 491 mPas
Content of primary OH groups in the product: 77%

Then, 183.1 mg of titanic acid tetrabutyl ester were added and the mixture was heated to 200° C., first under normal pressure, then under vacuum (1 mbar). After 107.7 g of ethanol had been distilled off, the reaction was terminated.

OH value of the resultant product: 73.0 mg KOH/g
Viscosity of the resultant product at 50° C.: 679 mPas
Content of primary OH groups in this product: 74%

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A poly(ether-ester) comprising the transesterification product of
   (1) monocarboxylic or polycarboxylic acid esters with one or more bound polyether chains which are the ring opening reaction products of:
      a) one or more monocarboxylic or polycarboxylic acid esters containing one or more hydroxyl groups and having the general formula

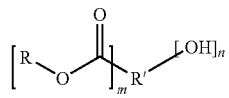

wherein:
         R represents a monovalent aryl, alkyl, aralkyl, alkenyl or alkynyl radical,
         R' represents an at least divalent aryl, alkyl, aralkyl, alkenyl or alkynyl radical,
         wherein:
            m=1 and n=1,
            m≧2 and n=1,
            or
            n≧2 and m=1;
      with
      b) alkylene oxides;
      and, optionally, in the presence of
      c) one or more diols and/or polyols,
      and, optionally,
      d) one or more dicarboxylic acid esters;
   and
   (2) a component selected from the group consisting of:
      (a) one or more diols and/or polyols;
      (b) diols, and dicarboxylic acids or dicarboxylic acid derivatives;
      (c) diols, or polyols and monocarboxylic acid esters, or monocarboxylic acids containing one or more hydroxyl groups;
      and
      (d) monocarboxylic or polycarboxylic acid esters, which may contain a free hydroxyl group;
   wherein (a), (b) and (c) yield an OH-functional poly(ether-ester) and (d) yields a poly(ether-ester) having ester terminal groups.

2. A poly(ether-ester) comprising the esterification product of
   (1) hydrolyzed monocarboxylic or polycarboxylic acid esters with a bound polyether chain, which are the ring opening reaction products of:
      a) one or more monocarboxylic or polycarboxylic acid esters containing one or more hydroxyl groups and having the general formula

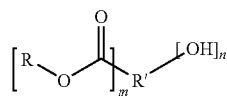

wherein:
         R represents a monovalent aryl, alkyl, aralkyl, alkenyl or alkynyl radical,
         R' represents an at least divalent aryl, alkyl, aralkyl, alkenyl or alkynyl radical,
         wherein:
            m=1 and n=1,
            m≧2 and n=1,
            or
            n≧2 and m=1;
      with
      b) alkylene oxides;
      and, optionally, in the presence of
      c) one or more diols and/or polyols,
      and, optionally,
      d) one or more dicarboxylic acid esters;
   and
      (2) one or more monocarboxylic or polycarboxylic acids, which may contain a free hydroxyl group,
   to yield a poly(ether-ester) having carboxylic acid terminal groups.

* * * * *